(12) United States Patent
Gerken et al.

(10) Patent No.: US 7,088,884 B2
(45) Date of Patent: Aug. 8, 2006

(54) APPARATUS AND METHOD EMPLOYING MULTILAYER THIN-FILM STACKS FOR SPATIALLY SHIFTING LIGHT

(75) Inventors: Martina Gerken, Mountain View, CA (US); David A. B. Miller, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 711 days.

(21) Appl. No.: 10/227,138

(22) Filed: Aug. 22, 2002

(65) Prior Publication Data

US 2004/0008928 A1 Jan. 15, 2004

Related U.S. Application Data

(60) Provisional application No. 60/395,427, filed on Jul. 12, 2002.

(51) Int. Cl.
*G02B 6/28* (2006.01)

(52) U.S. Cl. .............................. 385/24; 385/31; 385/36; 385/37; 359/115

(58) Field of Classification Search .................. 385/24, 385/31, 36–37; 359/115, 386, 138
See application file for complete search history.

(56) References Cited

U.S. PATENT DOCUMENTS

| | | | |
|---|---|---|---|
| 4,373,782 A | | 2/1983 | Thelen |
| 6,008,920 A | | 12/1999 | Hendrix |
| 6,011,652 A | | 1/2000 | Cushing |
| 6,111,674 A | | 8/2000 | Bhagavatula |
| 6,122,417 A | * | 9/2000 | Jayaraman et al. ............ 385/24 |
| 6,147,806 A | * | 11/2000 | Park et al. .................. 359/634 |
| 6,320,996 B1 | * | 11/2001 | Scobey et al. ................ 385/18 |
| 6,396,617 B1 | * | 5/2002 | Scalora ........................ 359/248 |
| 6,396,632 B1 | | 5/2002 | Liu et al. |
| 6,404,947 B1 | | 6/2002 | Matsuda |
| 6,404,958 B1 | | 6/2002 | Boye et al. |

OTHER PUBLICATIONS

Kosaka et al. "Superprism phenomena in photonic crystals," Phys. Rev. B, vol. 58, No. 16, Oct. 15, 1998.

Kosaka et al. "Photonic crystals for micro–lightwave circuits using wavelength–dependent angular beam steering," Appl. Phys. Lett., vol. 74, No. 10, Mar. 8, 1999.

N. Matuschek et al., "Analytical Design of Double–Chirped Mirrors with Custom–Tailored Dispersion Characteristics", IEEE Journal of Quantum Electronics, vol. 35, No. 2 (1999), pp. 129–137.

(Continued)

*Primary Examiner*—Michael G. Lee
*Assistant Examiner*—Seung H Lee
(74) *Attorney, Agent, or Firm*—Lumen Intellectual Property Services, Inc.

(57) ABSTRACT

An apparatus and method for spatially shifting a light using a multilayer thin-film stack of at least two materials having unequal optical properties, such as indices of refraction and absorption coefficients. The apparatus has an input face for admitting the light into the apparatus and an impedance matching mechanism for maximizing the in-coupling of the light into the multilayer thin-film stack at a non-normal incidence. The non-normal incidence is sufficient to generate a spatial shift of the light in the multilayer thin-film stack as a function of at least one light parameter, such as wavelength and/or polarization of the light, thereby separating the light into light components. The spatial shift is achieved by any one or any combination of effects including superprism, turning point and energy confinement. These effects are achieved in the multilayer thin-film stack by appropriately engineering its layer sequence.

41 Claims, 11 Drawing Sheets

OTHER PUBLICATIONS

M. Jablonsky et al., "The Realization of All–pass Filters for Third–order Dispersion Compensation in Ultrafast Optical Fiber Transmission Systems", Journal of Lightwave Technology, vol. 19, No. 8 (2001), pp. 1194–1205.

B.E. Nelson et al., "Use of a dielectric stack as a one–dimensional photonic crystal for wavelength demultiplexing by beam shifting", Optics Letters, vol. 25, No. 20, Oct. 15, 2000, pp. 1502–1504.

U.S. Appl. No. 09/778,327 to D.A.B. Miller et al.

U.S. Appl. No. 09/778,327 to David A.B. Miller et al.

B. E. Nelson, M. Gerken, D. A. B. Miller, R. Piestun, C. C. Lin, and J. S. Harris, "Wavelength Demultiplexing by Beam Shifting Using a Dielectric Stack as a One–Dimensional Photonic Crystal," *IEEE Lasers and Electro–Optics Society 2000 Annual Meeting*, Rio Grande, Puerto Rico (Nov. 13–16, 2000). Paper WJ4.

B. E. Nelson, M. Gerken, D. A. B. Miller, R. Piestun, C. –C. Lin, J. S. Harris, Jr., "Use of a dielectric stack as a one–dimensional photonic crystal for wavelength demultiplexing by beam shifting," *Opt. Lett.* 25/20, (2000) 1502–1504.

* cited by examiner

□ □ □ Silicon dioxide layers
○ ○ ○ Tantalum pentoxide layers

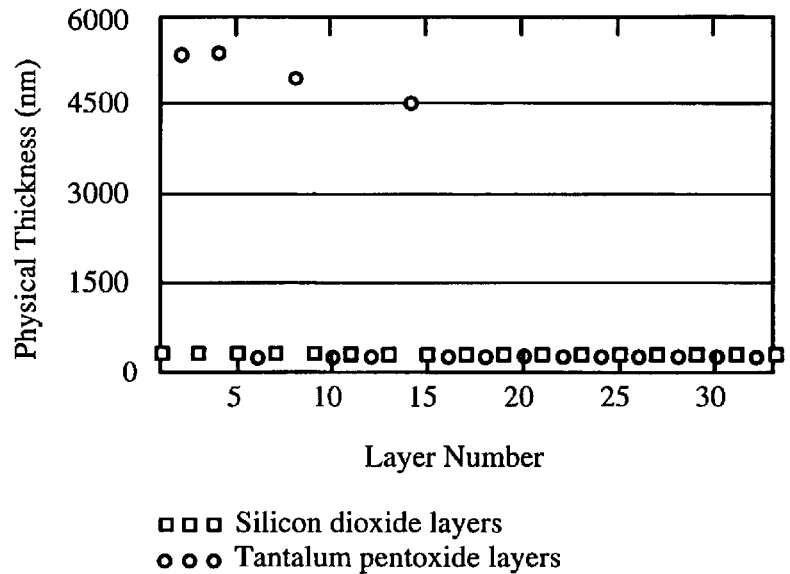
FIG. 7
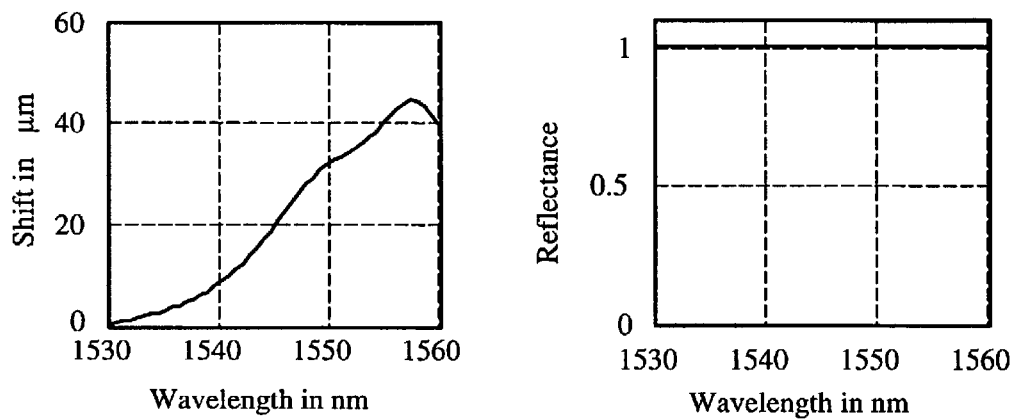
FIG. 8A  FIG. 8B

Position of Layers
— 1520 nm
— 1535 nm
— 1550 nm
· 1565 nm

US 7,088,884 B2

APPARATUS AND METHOD EMPLOYING MULTILAYER THIN-FILM STACKS FOR SPATIALLY SHIFTING LIGHT

CROSS-REFERENCE TO RELATED APPLICATIONS

This application is related to U.S. patent application Ser. No. 09/778,327 filed on Feb. 6th, 2001 and claims priority of U.S. Provisional Application 60/395,427 filed on Jul. 12th, 2002.

GOVERNMENT SPONSORSHIP

This invention was made with support from DARPA under contract number MDA972-00-1-0024. The government has certain rights in this invention.

FIELD OF THE INVENTION

This invention relates generally to methods and devices using multilayer thin-film stacks for dispersing light for applications including spatial multiplexing or demultiplexing, and in particular to the design of such stacks.

BACKGROUND ART

In optical communications the technique of wavelength-division multiplexing (WDM) allows several different light signals to be transmitted through a single optical fiber using a different wavelength for each signal. Implementation of WDM requires multiplexing techniques that spatially superimpose the light components or component beams of different wavelengths prior to transmission to form a single light beam. At the receiving end, WDM requires demultiplexing techniques that spatially separate the different light components of the single light beam to recover the original component beams.

In general, demultiplexing requires apparatus and methods for dispersing or spatially separating light into light components based on their constituent or component wavelengths. Conventional prisms or diffraction gratings are one means to select and separate different wavelengths of light. These conventional devices, however, have small dispersion (change in propagation angle with respect to wavelength). For example, typical gratings and prisms exhibits angular dispersion figures of less than 1°/nm. Therefore, they have to be quite large in order to achieve sufficient spatial separation of light components at different component wavelengths. The prior art teaches to replace gratings and prisms by alternative elements for effective wavelength separation.

Smaller, integrated arrayed waveguide grating (AWG) routers have been developed. Since waveguides are very temperature sensitive, these integrated devices need to be temperature-stabilized during operation. They are especially useful for high-channel count multiplexers and demultiplexers justifying the expensive fabrication and operation.

For lower-channel count systems, multilayer thin-film stacks are more cost-effective, since they are much less sensitive to temperature drift and normally do not require temperature stabilization during operation. Such stacked structures are constructed of a number of layers, e.g., alternating layers of a higher and lower refractive index dielectric material and spacer layers, as necessary. The thicknesses of the layers and their refractive indices determine the optical properties of these structures.

There are many examples of multiplexers and demultiplexers in the prior art using the transmission and reflection properties of multilayer thin-film structures as a function of wavelength or polarization. Such transmissive or reflective thin-film structures are often referred to as thin-film filters, including, e.g., a thin-film edge filter built of alternating layers of dielectric and spacer layers as taught by Thelen in U.S. Pat. No. 4,373,782. In this filter the bandpass reflectance characteristic of transition wavelength edges is non-polarizing for radiation incident at a preselected non-normal angle. Thin film filters are also used in conjunction with broadband reflecting regions in wavelength selective optical switches, as described, e.g., by Scobey et al. in U.S. Pat. No. 6,320,996. Improvements to the performance of thin-film bandpass filters, e.g., reduction of ripple effects and improvements to bandpass transmission are further described by Cushing in U.S. Pat. No. 6,011,652 entitled "Multilayer thin film dielectric bandpass filter". In U.S. Pat. No. 6,147,806 to Park et al. describes the use of dichroic mirrors for demultiplexing of light into three color components. In U.S. Pat. No. 6,396,632 Liu et al. teach a tunable optical filter and an optical modulator that use a conventional thin film optical filter whose thickness is adjusted with the aid of a piezoelectric layer. The use of thin film filters in conjunction with dispersive elements for multiplexing applications is taught by Boye et al. in U.S. Pat. No. 6,404,958. In U.S. Pat. No. 6,122,417 Jayaraman et al. teach the use of a stack of layers as a Fabry-Perot cavity to multiplex and demultiplex an optical laser signal containing several different wavelengths. In fact, Jayaraman employs a linear array of Fabry-Perot cavities as filters to construct a WDM multiplexer-demultiplexer. It should be noted that the reflection/transmission wavelengths of Fabry-Perot filters are determined based on the physical principles of resonant optical cavities by adjusting the longitudinal dimension of the cavity to control the radiation modes that are resonant in the cavity. All of these devices use the well-known transmission and reflection properties of thin-film structures. Since these properties only allow for the separation into two different light paths—a reflection and a transmission path—a different thin-film filter structure is needed for each wavelength component to be demultiplexed. Thus, for a higher channel count system, many different thin-film filters have to be cascaded resulting in numerous or complicated components and high cost.

To reduce the number of components in a thin-film demultiplexing system, prior art has also investigated the use of thin-film filters in special geometries. For example, U.S. Pat. No. 6,008,920 to Hendrix teaches multiple channel multiplexer/demultiplexer devices using a single constant, non-variable wavelength selective optical interference filter preferably made of tens of layers and forming several cavities. The apparatus uses the angle-shift property of the thin-film filter, wherein the wavelength-selectivity changes with changing angle of incidence. Hendrix uses a system, e.g., a solid glass wedge adjacent the filter, to vary the angle of incidence and thus achieve wavelength selectivity.

In U.S. Pat. No. 6,111,674 Bhagavatula teaches the use of an optical path length generator with a plurality of partially reflective surfaces to build a multiple reflection multiplexer and demultiplexer. The partially reflective surfaces reflect successive portions of the energy of each of the different wavelength signals along different length optical paths. These intermediate pathways are recombined by a lens to achieve demultiplexing.

In U.S. Pat. No. 6,404,947 Matsuda teaches the use of a photonic crystalline layer composed of a stack of layers made up of multiple fine lines for wavelength separation in a demultiplexer and demultiplexer-receiver. By changing the spacing of the fine lines along the layer, the change in the position of the band edge of this two-dimensional photonic crystal is used for demultiplexing. Although these structures are more compact than other prior devices, their fabrication is complex and expensive.

In order to increase the dispersion, prior art has also investigated the use of higher-dimensional structures, i.e., structures that have varying optical properties in two- or three-dimensions. Recently, Kosaka et al. ("Superprism phenomena in photonic crystals," Phys. Rev. B, Vol. 58, No. 16, 15 Oct. 1998; "Self-collimating phenomena in photonic crystals," Appl. Phys. Lett., Vol. 74, No. 9, 1 Mar. 1999; "Photonic crystals for micro-lightwave circuits using wavelength-dependent angular beam steering," Appl. Phys. Lett., Vol. 74, No. 10, 8 Mar. 1999) have proposed a method based on photonic crystals that can give angular dispersion many times larger than a prism or diffraction grating by relying on the "anomalous dispersion effect" or the "superprism effect" observed for non-normal incidence light.

It should be noted that the dispersive effects of thin film stacks on one-dimensional or normal-incidence light have been studied. N. Matuschek et al., "Analytical Design of Double-Chirped Mirrors with Custom-Tailored Dispersion Characteristics", IEEE Journal of Quantum Electronics, Vol. 35, No. 2 (1999), pp. 129–137 and M. Jablonsky et al., "The Realization of All-pass Filters for Third-order Dispersion Compensation in Ultrafast Optical Fiber Transmission Systems", Journal of Lightwave Technology, Vol. 19, No. 8 (2001), pp. 1194–1205 discuss the theory and uses of temporal dispersion characteristics of thin film stacks acting as all-pass reflection filters. In order to improve the performance of their thin film stack mirrors Matuschek et al. teach the use of chirping a stack mirror, i.e., slowly increasing the volume ratio between the two different materials to reduce the reflection off the front of the stack by impedance matching.

B. E. Nelson et al., "Use of a dielectric stack as a one-dimensional photonic crystal for wavelength demultiplexing by beam shifting", Optics Letters, Vol. 25, No. 20, Oct. 15, 2000, pp. 1502–1504 and U.S. application Ser. No. 09/778,327 to D. A. B. Miller et al. teach the use of a dielectric stack that relies on group velocity dispersion in accordance with the superprism effect to spatially separate light beams of different component wavelengths. In this case the group velocity dispersion occurring just outside the main reflection region of a multilayer stack of dielectrics is used for wavelength multiplexing and demultiplexing.

Although these teachings go a long way to improving the efficiency and spatial separation of wavelength components of light by using the superprism effect in multilayer dielectric stacks, further improvements in efficiency and spatial separation are desired. Hence, what is needed is a compact device using a multilayer stack for multiplexing and demultiplexing of light in accordance with the superprism effect. The device should exhibit improved spatial separation characteristics of the wavelength components as well as high efficiency. Furthermore, what is needed is a multiplexing and demultiplexing device that is both very compact and easily fabricated.

OBJECTS AND ADVANTAGES

In view of the above shortcomings of the prior art the main object of the present invention is to provide an efficient apparatus and method for multiplexing and demultiplexing of light in a dielectric stack employing the superprism effect. In particular, the apparatus and method of invention is to provide for improved in-coupling of light into the dielectric stack.

It is another object of the invention to provide a multiplexing and demultiplexing apparatus and method ensuring improved spatial resolution of the different wavelength components contained in the incident light.

It is yet another object of the invention to provide that the apparatus of the invention is compact and easy to fabricate.

These and other objects and advantages will become apparent upon reading the ensuring description.

SUMMARY

The objects and advantages of the invention are secured by an apparatus designed for spatially shifting a light with the aid of a multilayer thin-film stack of at least two materials having unequal optical properties, e.g., unequal indices of refraction and absorption coefficients. The apparatus has an input face for admitting the light into the apparatus and an impedance matching mechanism for maximizing the in-coupling of the light into the multilayer thin-film stack at a non-normal incidence. The non-normal incidence is sufficient to generate a spatial shift of the light in the multilayer thin-film stack as a function of at least one light parameter of the light.

The multilayer thin-film stack is made up of a layer sequence, where the individual layers are made of the at least two different materials. In one embodiment the layer sequence is engineered such that it defines a turning point for at least one light component of the light as a function of the at least one light parameter. The light parameter can be the wavelength or polarization of the light. In another embodiment, the layer sequence is engineered such that it defines an energy confinement region for at least one light component as a function of at least one light parameter, i.e., wavelength and/or polarization of the light.

The multilayer thin film stack can be engineered in accordance with many algorithms and rules to produce complex layer sequences defining turning points and energy confinement regions for certain light components. For example, in one embodiment the layer sequence or a part of it may contain a chirped layer sequence. In another embodiment, the multilayer thin-film stack is a chirped Bragg stack. In yet another embodiment, the multilayer thin-film stack includes an all-pass filter.

The materials making up the layers of the multilayer thin-film stack can have a reflection band excluding a bandwidth of the light. For example, the multilayer thin-film stack can include a Bragg stack and the reflection band can correspond to a stop band of the Bragg stack.

The impedance matching mechanism can include any mechanism selected from among optical cavities, anti-reflection coatings, chirped Bragg stacks and double-chirped Bragg stacks. Preferably, the impedance matching mechanism is integrated into the multilayer thin-film stack.

The spatial shifting of light by the apparatus is preferably used for spatial separation of the light as a function of wavelength and/or polarization. Preferably, the apparatus has an output face for emitting the spatially separated light. Depending on the geometry chosen the output face can be located opposite the input face or on the same side as the input face. The path of the light through the apparatus can additionally be extended to obtain increased spatial shifting by using reflectors positioned in the path of the light to reflect the light into the multilayer thin-film stack. In the same or different embodiment lenses can be employed for converting the spatial shift into an angular shift, e.g., to further increase the spatial separation of light of different wavelengths and/or polarizations.

In some embodiments the apparatus of the invention can be made without the impedance matching mechanism. In these embodiments light is admitted directly into the multilayer thin-film stack at non-normal incidence. It should be also noted that in some embodiments the layer sequence is engineered to define one or more turning points as well as one or more energy confinement regions for one or more light components of the in-coupled light.

Spatial shifting of light in accordance with the invention can be used for demultiplexing light into constituent light components, e.g., light components at different wavelengths or polarizations operating in reverse, the spatial shifting can be used to combine or multiplex a number of light components at different wavelengths or polarizations into one light, e.g., a single light beam. In a preferred embodiment of the method for demultiplexing the layer sequence of the multilayer thin-film stack is adjusted such that the light components are out-coupled through the output face at separations or distances that vary linearly with the light parameter, e.g., wavelength. Similarly, during multiplexing it is preferable that the amount of spatial shift varies linearly with the light parameter, e.g., wavelength of the light components, as this makes it easier to combine the light components into one light.

The details of the invention are described in the ensuing detailed description in reference to the attached drawing figures.

BRIEF DESCRIPTION OF THE DRAWING FIGURES

Figure 5:
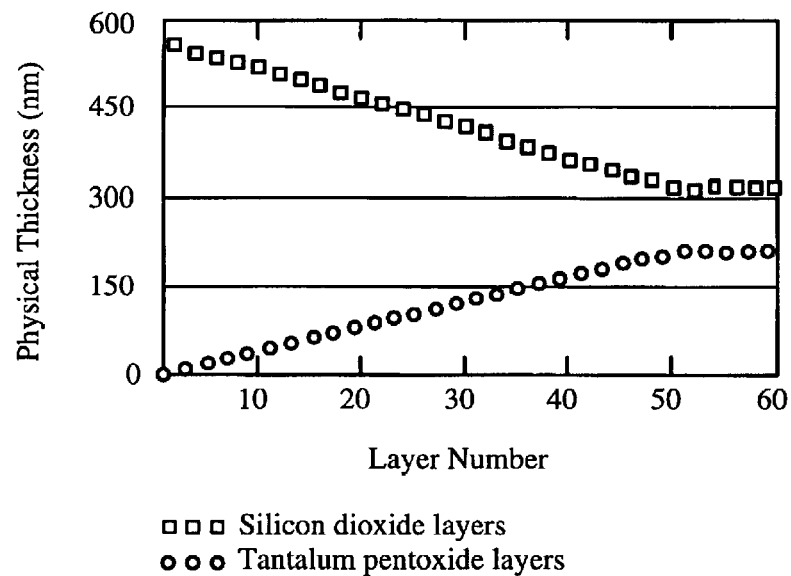
FIG. 5 is a graph illustrating the thicknesses of a 60-layer double-chirped silicon dioxide/tantalum pentoxide structure using a wavelength dependent turning point in accordance with the invention.
Figure 6A:
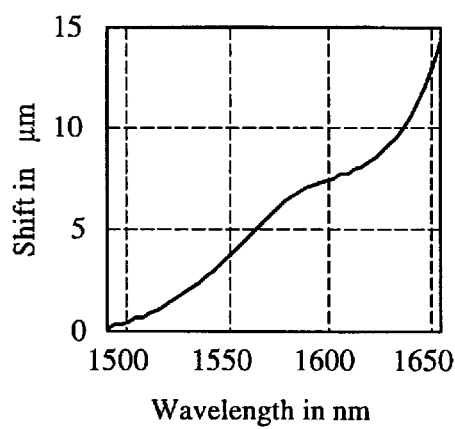

FIGS. 6A&B are graphs illustrating the performance of the structure of FIG. 5.

FIG. 7 is a graph illustrating the thicknesses of a 33-layer four-cavity silicon dioxide/tantalum pentoxide structure using the principle of energy confinement regions in the cavities.

FIGS. 8A&B are graphs illustrating the performance of the structure of FIG. 7.

Figure 9:
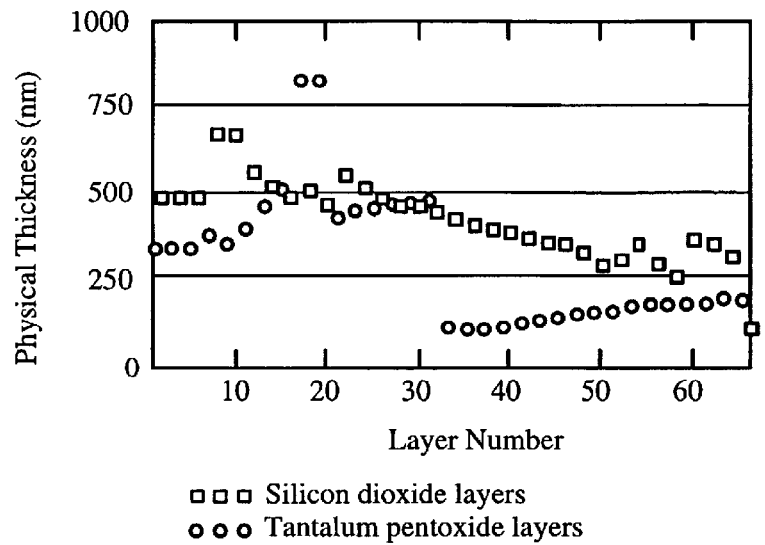

FIG. 9 is a graph illustrating the thicknesses of a 66-layer silicon dioxide/tantalum pentoxide structure using a combination of the turning point, energy confinement and superprism effects.

Figure 10A:
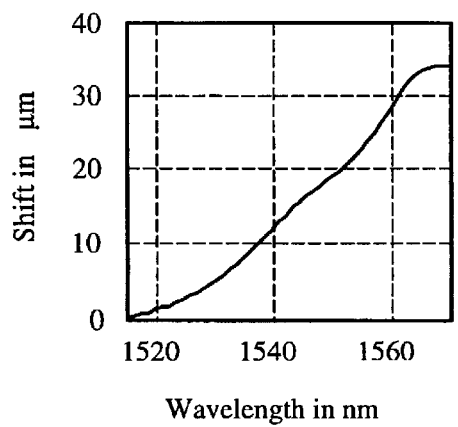

FIGS. 10A&B are graphs illustrating the performance of the structure of FIG. 9.

Figure 11:
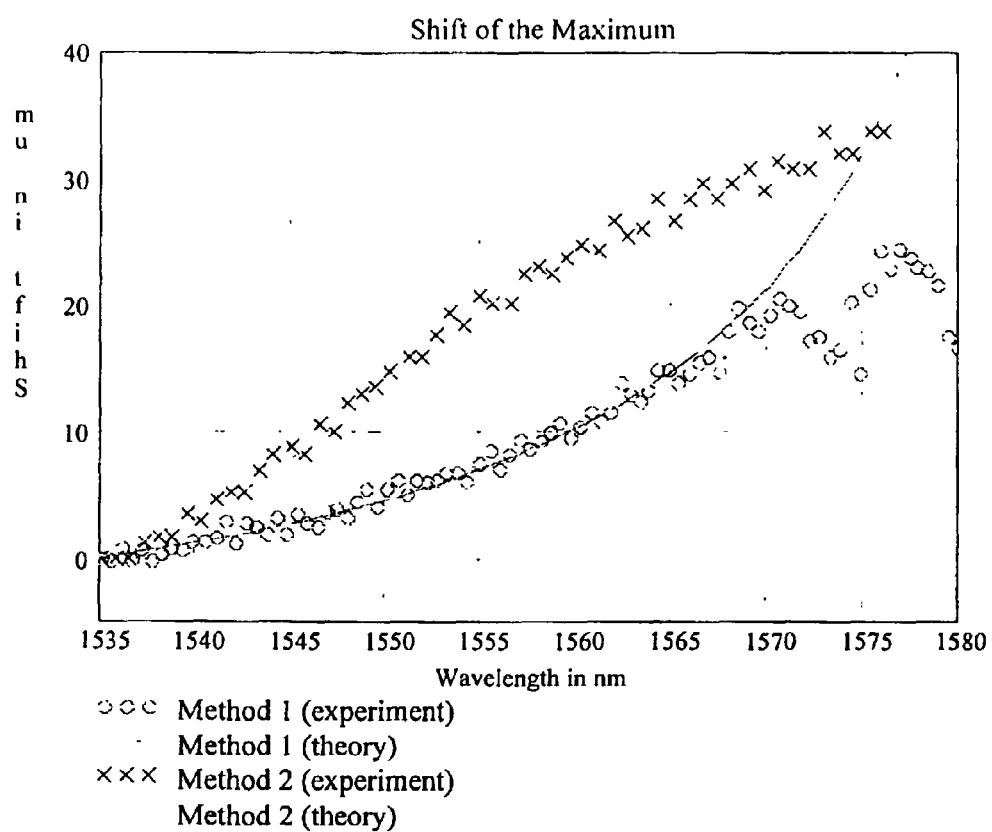

FIG. 11 are graphs illustrating the comparison of experimental and theoretical light shifts as a function of wavelength for a 200-layer stack in accordance with the prior art and a 66-layer non-periodic layer sequence in accordance with the invention.

Figure 12A:
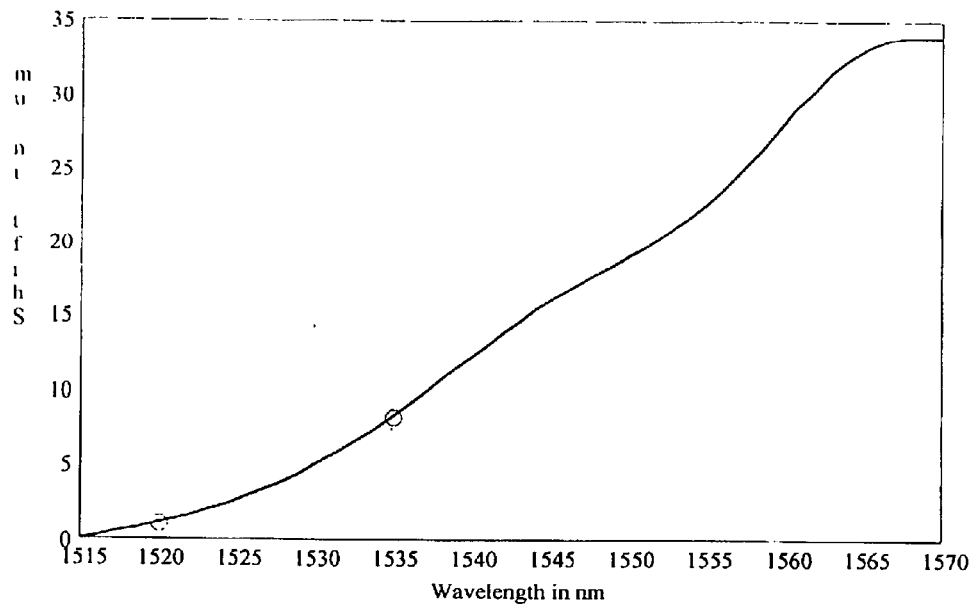

FIG. 12A is a graph illustrating the light shift in the 66-layer non-periodic layer sequence of FIG. 11.

Figure 12B:
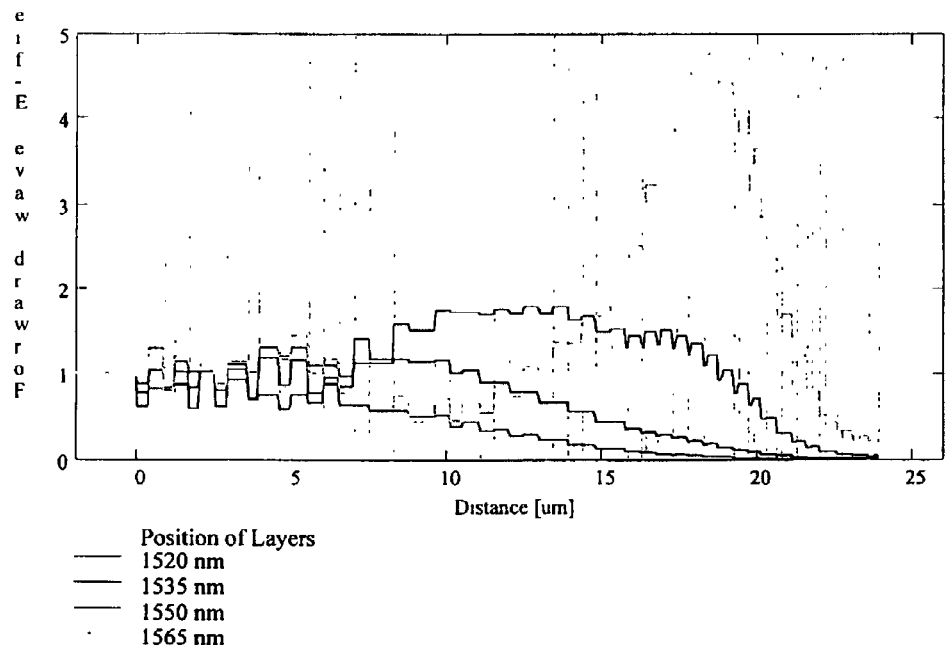

FIG. 12B is a graph illustrating the forward propagating electric field intensity for four different wavelengths in the 66-layer non-periodic layer sequence of FIG. 11.

Figure 13:
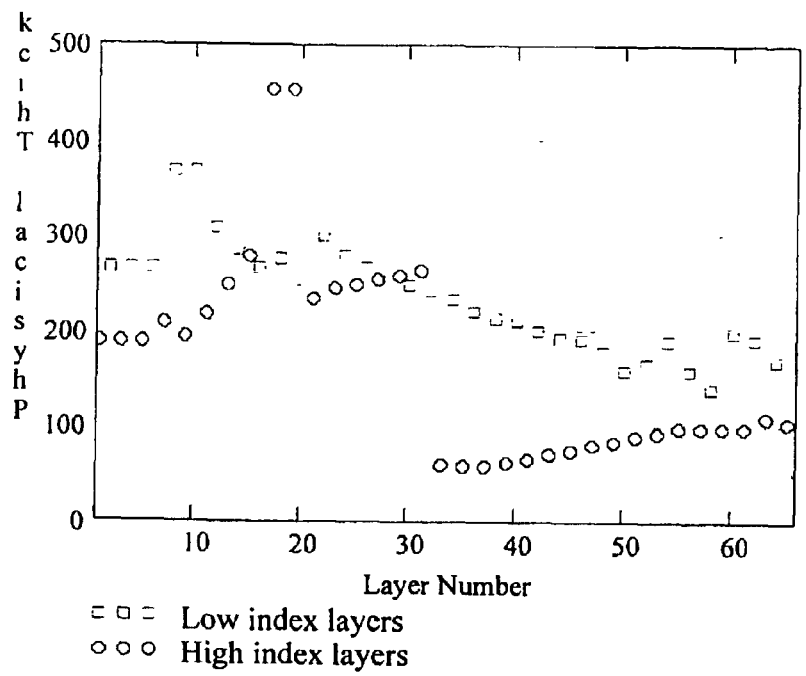

FIG. 13 is a graph illustrating the thicknesses of the layers of the 66-layer non-periodic layer sequence of FIG. 11.

Figure 14:
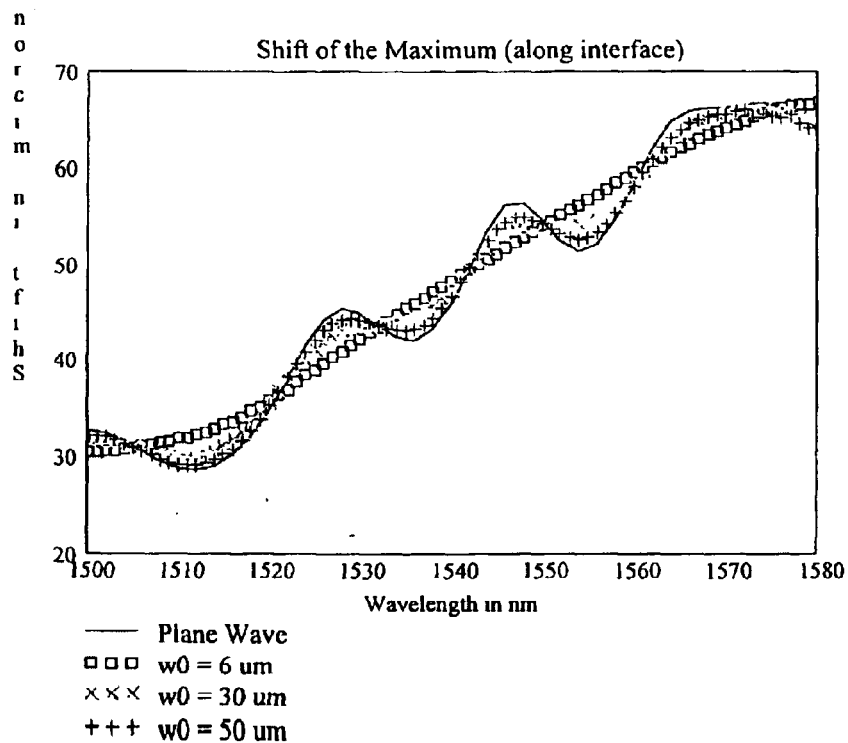

FIG. 14 is a graph of a structure exhibiting a staircase-like spatial shift with wavelength for corresponding spot sizes w0=6 μm, w0=30 μm and w0=50 μm.

Figure 15:
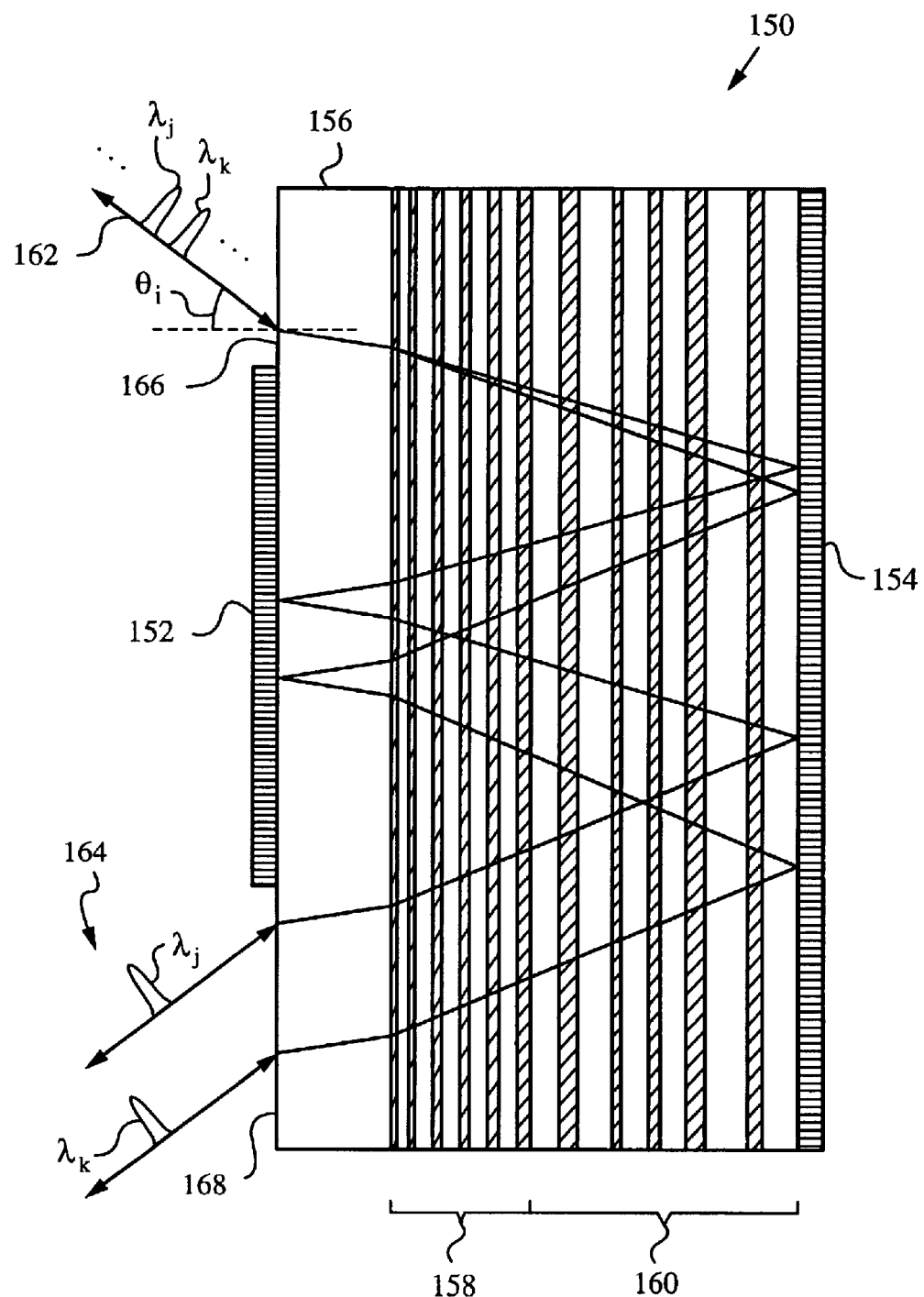

FIG. 15 is a cross sectional view of another apparatus for demultiplexing or multiplexing of light employing mirrors.

Figure 16:
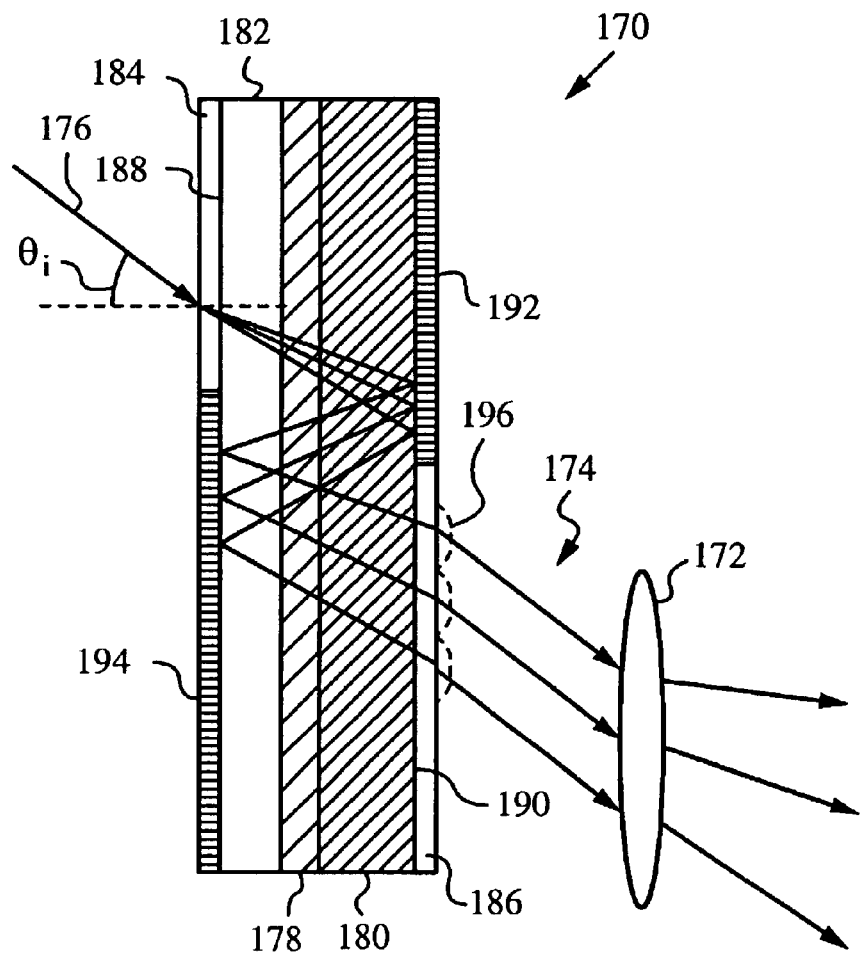

FIG. 16 shows an alternate embodiment of the invention including a lens.

DETAILED DESCRIPTION

Figure 1:
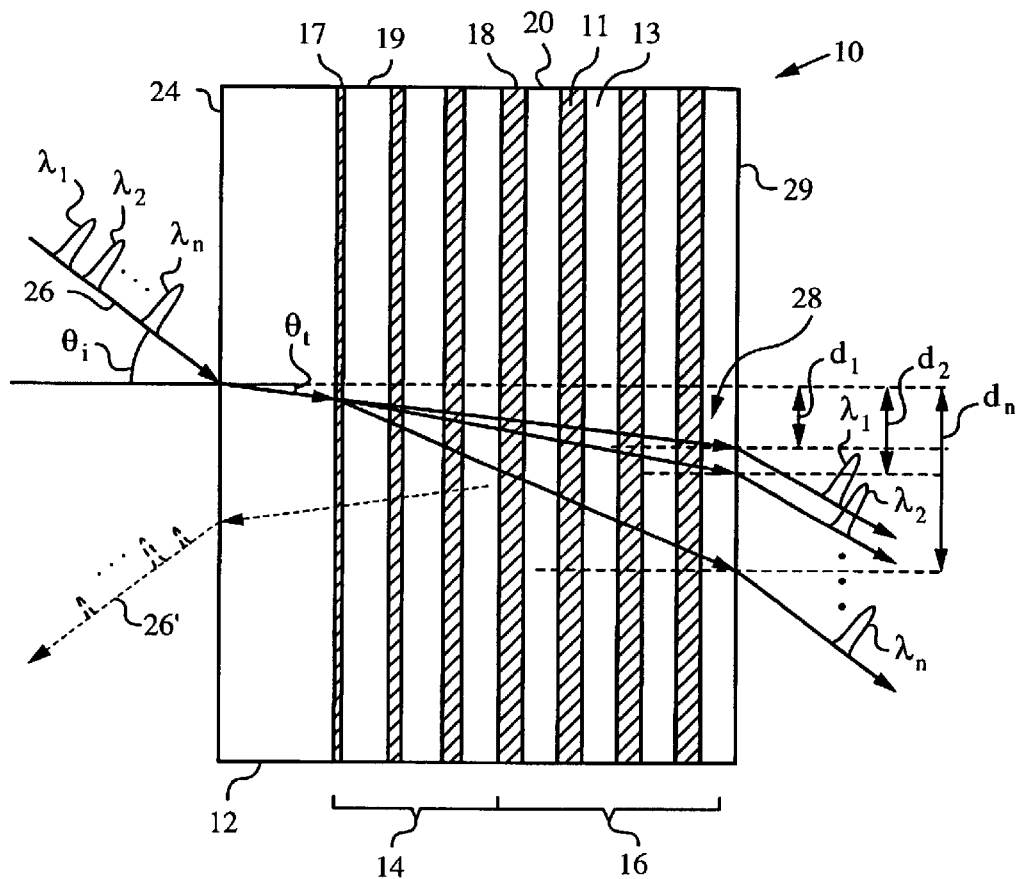
FIG. 1 is a cross sectional view of an apparatus for demultiplexing light in accordance with the invention.
Figure 2:
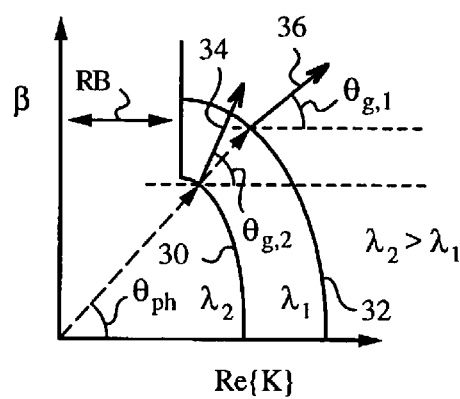
FIG. 2 is a wave vector diagram illustrating the physical principles of the superprism effect.

The present invention will be best understood by initially referring to an apparatus 10 in accordance with the invention shown in a cross sectional view in FIG. 1 and to the wave vector diagram in FIG. 2. As shown in FIG. 1, apparatus 10 has a substrate 12, an impedance matching mechanism 14 and a multilayer thin-film stack 16 composed of layers 18, 20 made of two different materials 11, 13. Materials 11, 13 have unequal optical properties. Specifically, in the present embodiment materials 11, 13 have different indices of refraction. Also in the present embodiment, mechanism 14 has layers 17, 19 made of the same materials 11, 13 as layers 18, 20. The sequence of layers 17, 19 is chirped linearly in thickness. In other words, the thickness of successive layers 17 increases linearly while the thickness of successive layers 19 decreases linearly, thus forming a chirped Bragg stack 14. Layers 17, 19 of chirped Bragg stack 14 immediately adjacent thin-film stack 16 have thicknesses matched to those of layers 18, 20. In this manner, chirped Bragg stack 14 is merged or integrated with thin-film stack 16.

Bragg stack 14 and thin-film stack 16 are shown with just a few layers 17, 19 and 18, 20. In fact, there may be 30 to 60 layers 17, 19 and 18, 20 or more, yielding a total thickness typically on the order of several microns. In general, the thickness of stack 16 is selected so that the total path of a light 26 through stack 16 is sufficient to spatially shift light 26 and in this case decompose or demultiplex light 26 into individual light components 28 as a function of at least one light parameter. In the present embodiment the light parameter chosen is wavelength and thus light 26 is broken up into light components 28 as a function of component wavelengths $\lambda_1, \lambda_2, \ldots \lambda_n$.

In stacks 14, 16 all layers 17, 18 are of the same material and layers 18 all have a similar thickness, typically on the order of 100 nm. Likewise, all layers 19, 20 are of the same material and all layers 20 have a similar thickness as well, e.g., on the order of 100 nm. In the present embodiment layers 17, 18 are made of material 11 having a refractive index $n_1$, and layers 19, 20 are made of material 13 having a refractive index $n_2$ distinct from $n_2$. In other words, stacks 14, 16 are made of alternating layers 17, 18 and 19, 20 having alternating indices of refraction $n_1$, $n_2$. Many different materials 11, 13 including dielectrics and semiconductors are suitable for making layers 17, 18, and 19, 20 of stacks 14, 16. For example, materials such as GaAs, AlGaAs, GaAlAs and Al oxide represent suitable semiconductors. Alternatively, materials such as silicon dioxide, tantalum pentoxide, and titanium dioxide are suitable dielectrics.

Thin-film stack 16 is fabricated directly on top of Bragg stack 14 and Bragg stack 14 is fabricated directly on top of substrate 12. In the present embodiment, GaAs ($n_1$=3.6) and AlGaAs ($n_2$=3.0) are used as materials 11, 13. Meanwhile, substrate 12 is made of GaAs. The use of GaAlAs and Al oxide as high and low index materials 11, 13 is also convenient because Al oxide can be formed effectively by the oxidation of AlAs. Moreover, AlAs and GaAlAs can be grown effectively using modern semiconductor growth techniques such as molecular beam epitaxy or metal organic chemical vapor deposition, allowing such structures to be integrated with other semiconductor optical, electronic, or optoelectronic devices during the same processing.

Apparatus 10 has an input face 24 for admitting light 26 at a non-normal incidence, here indicated by angle of incidence $\theta_i$. Apparatus 10 also has an output face 29 opposite input face 24. In accordance with Snell's law, light 26 enters and propagates through substrate 12 of apparatus 10 at non-normal transmission angle $\theta_t$. Therefore, in-coupled light 26 is incident on Bragg stack 14 at non-normal incidence, i.e., at transmission angle $\theta_t$. The function of Bragg stack 14 is to match the propagation properties of light 26 between substrate 12 and thin-film stack 16 and to thus maximize the in-coupling of light 26 into thin-film stack 16 at this non-normal incidence. Usually, the mismatch in material, optical properties and periodicity between substrate 12 and layers 18, 20 of stack 16 produces an impedance difference between substrate 12 and stack 16 that causes some of light 26 to be reflected in the form of reflected light 26'. Specifically, without Bragg stack 14 one will observe a large spurious reflection of light 26 off the front of thin-film stack 16 and therefore a high loss. Bragg stack 14 matches the impedances of substrate 12 and stack 16 to prevent reflection losses. For more detailed information on designing gratings for impedance matching the reader is referred to N. Matuschek et al., "Analytical Design of Double-Chirped Mirrors with Custom-Tailored Dispersion Characteristics", IEEE Journal of Quantum Electronics, Vol. 35, No. 2 (1999), pp. 129–137.

The operation of apparatus 10 is based on the "anomalous dispersion effect" or the "superprism effect". In contrast to a Bragg reflector, which must have a periodic structure in order to function as intended, stack 16 need not have layers 18, 20 with periodic thicknesses. Layers 18, 20 may have non-periodic thicknesses as discussed in embodiments below. The key design criterion is that there be a substantially non-zero group velocity dispersion in the wavelength region of operation, i.e., in the wavelength region containing component wavelengths $\lambda_1, \lambda_2, \ldots \lambda_n$. That is, the variation in phase of light 26 as it passes through stack 16 should have a substantially nonlinear dependence upon its frequency.

Now, the wavelength region of operation containing wavelengths $\lambda_1, \lambda_2, \ldots \lambda_n$ is just outside the main reflection band of the materials making up stack 16. In this region, there is strong group velocity dispersion while light 26 can still propagate through stack 16. When light 26 enters stack 16 at non-normal incidence the effect of group velocity dispersion produces a wavelength-dependent spatial shift of beam 26, thereby separating beam 26 into light components 28 as a function of component wavelengths $\lambda_1, \lambda_2, \ldots \lambda_n$. In other words, the group velocity dispersion effect causes spatial shifting of light 26 as a function of wavelength, resulting in angular demultiplexing of light 26 into light components 28. Light components 28 exit apparatus 10 along output face 29 where they emerge spatially separated as a function of wavelength. It is understood that, though light components 28 are shown propagating in straight lines inside apparatus 10, such straight lines are shown only for simplicity and clarity in FIG. 1. The actual paths of light components 28 will not in general be straight in regions where the thicknesses of the component layers 17 and 19 or 18 and 20 are varying, as they are in region 14.

The spatial shift giving rise to the angular demultiplexing of light 26 into light components 28 is possible because it is the group velocity, and not the phase velocity, that governs the energy flow of light 26, and these two velocities are different in stack 16. The wave vector diagram of FIG. 2 illustrates the dispersion relation among the real part of the Bloch wave vector Re{K}, which points in a direction perpendicular to layers 18, 20 and wave vector β, which points in a direction parallel to layers 18, 20 for light 26 within stack 16. Specifically, the dispersion relation is illustrated by parametric plots 30 and 32 of Re{K} and β for wavelengths $\lambda_1$ and $\lambda_2$ near main reflection band RB of stack 16. Light 26 at a given angle of incidence into stack 16 has a corresponding phase velocity angle $\theta_{ph}$. Arrows 34, 36 indicate group velocity directions. Arrows 34, 36 are perpendicular to plots 30 and 32 and thus define group velocity angles $\theta_{g,1}$ for wavelength $\lambda_1$ and $\theta_{g,2}$ for wavelength $\lambda_2$. Clearly, near main reflection band RB the curvatures of plots 30, 32 are significantly different. Thus, group velocity angles $\theta_{g,1}$ for wavelength $\lambda_1$ and $\theta_{g,2}$ for wavelength $\lambda_2$ are also very different. Since light components 28 at wavelengths $\lambda_1$ and $\lambda_2$ propagate in the directions dictated by their group velocity angles $\theta_{g,1}$ and $\theta_{g,2}$ they diverge angularly resulting in spatial shifting that leads to angular demultiplexing. This effect is frequently referred to as anomalous dispersion or the superprism effect by those skilled in the art.

Preferably, the group velocity dispersion effect in stack 16 is strong to yield good spatial resolution of light components 28. In other words, the group velocity dispersion effect in stack 16 is preferably sufficient to yield significant distances $d_1, d_2, \ldots d_n$ between the point of entry of light 26 on input face 24 and points of exit of light components 28 along output face 29. Such strong effect can be achieved in many different structures, as will be appreciated and understood by those skilled in the art in view of the teachings of the present invention. Accordingly, stack 16 used in the present invention is not limited to the specific structures explicitly illustrated. Preferably, apparatus 10 produces sufficient group velocity dispersion to yield an angular dispersion of greater than 2 degrees per nm change of free-space wavelength of light 26 within 5 nm wavelength of the main reflection band, and greater than 10 degrees per nm within 1 nm of the main reflection band. Thus, it is preferable to operate apparatus 10 with component wavelengths $\lambda_1, \lambda_2, \ldots \lambda_n$ very close to the edge of the main reflection band RB in order to maximize the separation of wavelength components 28.

Apparatuses yielding smaller, but substantially-non-zero group velocity dispersions are also within the scope of the present invention. Preferably, the angular dispersion is at least 0.2 degrees per nm within 5 nm of the main reflection region, and at least 1 degree per nm within 1 nm of the main reflection region. In addition, it should be noted that, because light 26 passes through stack 16 only within a certain range of angles, a main reflection band gap at all angles of incidence is not a necessary property of stack 16. The main reflection region is understood in the present context to be a region of substantial reflection, and for the largest angular dispersions, such a main reflection region is preferably a region of substantially complete reflection, where substantially complete reflection is understood to mean reflectivity of at least 90%, or preferably at least 95%, or more preferably at least 98%, or most preferably at least 99%. In case of a purely periodic structure of stack 16, it will be noted that the main reflection region corresponds to the photonic crystal band gap. It should be understood that such substantially complete reflection is not essential for the operation of apparatus 10, but is merely a preferred condition for achieving the largest angular dispersion or superprism effect.

Apparatus 10 can be used in accordance with the above-described principles to efficiently demultiplex light 26 into light components 28 at different components wavelengths $\lambda_1, \lambda_2, \ldots \lambda_n$. Light components 28 are out-coupled through output face 29 and can be further processed as desired by additional optics (not shown). Thus, apparatus 10 can serve the function of a demultiplexer in an optical system or network, e.g., a wavelength-division multiplexed (WDM) communication network. Alternatively, apparatus 10 can be operated in reverse to combine or multiplex light components 28 to produce light 26. Apparatus 10 can also be used to spatially shift light 26 as a function of a light parameter other than wavelength, and specifically as a function of polarization of light 26. That is because stack 16 is sensitive to different polarizations such that they emerge spatially separated along output face 29. Thus, apparatus 10 can be used to demultiplex light 26 into two orthogonal polarizations such as the s- and p-polarizations or to multiplex light components 28 exhibiting the s- and p-polarizations.

Figure 3:
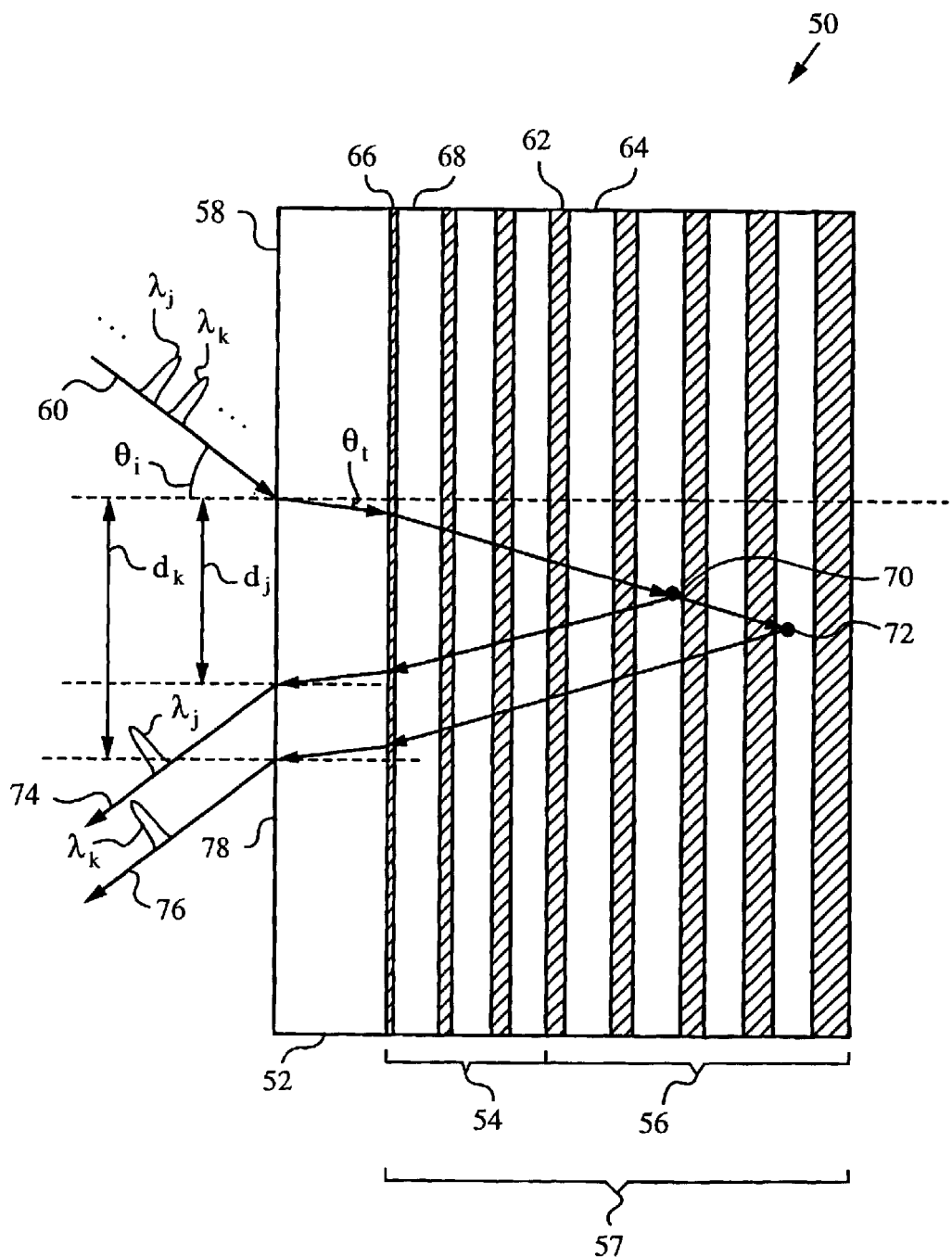
FIG. 3 is a cross sectional view of an apparatus for demultiplexing or multiplexing light employing a multilayer thin-film stack having a layer sequence defining turning points for certain light components.

FIG. 3 illustrates another embodiment of an apparatus 50 in accordance with the invention. Apparatus 50 has a substrate 52, an impedance matching mechanism 54 in the form of a double-chirped Bragg stack, and a multilayer thin-film stack 56. Apparatus 50 has an input face 58 for admitting a light 60 containing a number of component wavelengths within a desired operation bandwidth, of which component wavelengths $\lambda_j$ and $\lambda_k$ are expressly indicated.

Stack 56 has a number of layers 62, 64 made of materials having unequal refractive indices. Stack 54 has a number of layers 66, 68 made of the same materials as layers 62, 64 of stack 56. Stack 54 is chirped in that the physical thicknesses of successive layers 66 increase while the physical thicknesses of successive layers 68 are reduced. This type of impedance matching is preferred, as only two distinct materials need to be deposited. The impedance matching could also be achieved by chirping the refractive indices, i.e. the refractive indices of successive layers 66 increase while the refractive indices of successive layers 68 are reduced. Appropriate materials engineering methods, e.g., semiconductor material composition variations, to achieve the requisite variation in the refractive indices in refractive index chirped stack 54 are well-known to those skilled in the art.

The sequence of physical thicknesses and optical properties (indices of refraction and absorption coefficients) of layers 62, 64 hereafter simply called layer sequence of thin-film stack 56 is selected to define two turning points 70, 72 for light components 74, 76 of light 60. More precisely, the layer sequence of layers 62, 64 is engineered to define turning points 70, 72 as a function of wavelength. Thus, light component 74 with component wavelength $\lambda_j$ turns or is reflected by stack 56 at turning point 70. Meanwhile, light component 76 with component wavelength $\lambda_k$ is reflected by stack 56 at turning point 72.

The principle of this depth-dependent reflection of stack 56 does not rely on the superprism effect. Rather, it relies on the fact that light 60 and more specifically different wavelengths of light 60, such as light components 74, 76 at wavelengths $\lambda_j, \lambda_k$, propagate to different depths in stack 56 before being reflected. In the present embodiment, the layer sequence of layers 62, 64 defines a chirped Bragg stack. As is well known, in chirped Bragg stacks the center wavelength of the Bragg stack, i.e., the wavelength that is reflected by the stack, changes as a function of position in the stack. Hence, the turning point for any particular wavelength is associated with a position in chirped Bragg stack 56. Stack 54 that is chirped for impedance matching and stack 56 that is chirped to obtain a depth-dependent reflection are preferably integrated into a single double-chirped stack 57.

The algorithm used for engineering the layer sequence of stacks 54 and 56 is to first design double-chirped stack 57 for normal incidence light, rather than for non-normal incidence light 26. Appropriate design of double-chirped stack with temporal dispersion for normal incidence is described by N. Matuschek et al., "Analytical Design of Double-Chirped Mirrors with Custom-Tailored Dispersion Characteristics", IEEE Journal of Quantum Electronics, Vol. 35, No. 2 (1999), pp. 129–137. The double-chirped stack 57 designed for normal incidence is then converted for spatial dispersion of light 26 at non-normal incidence. Since temporal dispersion and spatial dispersion are approximately proportional, this conversion can be performed by adjusting the thicknesses of layers 62, 64 and 66, 68 for non-normal incidence of light 26. This is done such that the local Bragg wavelengths of the converted double-chirped stack 57 at non-normal incidence remain identical to the local Bragg wavelengths of the double-chirped stack at normal incidence before conversion. Specifically, this is performed by dividing the layer thicknesses of the double-chirped stack 57 initially designed for normal incidence by:

$$\sqrt{1 - \left(\frac{\sin(\theta_i)}{n}\right)^2},$$

where $\theta_i$ is the angle of incidence of light 26 in air and n is the refractive index of the layer to be converted. It is understood that additional spatial shifting due to the superprism effect may be obtained in this embodiment when the materials making up the double-chirped stack 57 has a reflection band excluding the bandwidth of light 60.

During operation, the difference in depth between turning points 70, 72 within stack 56 produces different amounts of spatial shift along an output face 78 for light components 74, 76. As noted above, this shift can be further enhanced by the superprism effect. It should also be noted that in this embodiment output face 78 and input face 58 are on the same side of apparatus 50, and are in fact portions of the same surface. The distances between the entry point of light 60 and exit points of spatially separated light components 74, 76 are indicated by $d_j$ and $d_k$. Apparatus 50 can be used as shown to demultiplex light 60 as a function of wavelength. Alternatively, it can be operated in reverse to multiplex light components of different wavelengths.

In order to multiplex or demultiplex light 60 into light components as a function of polarization, stack 56 is designed such that different polarization components are reflected at different depths of stack 56. This can, for example, be accomplished by using the fact that the reflection band of a Bragg stack has different widths for s-polarization and p-polarization at non-normal incidence. In such an exemplary case, the Bragg wavelength is chosen such that light component of one polarization is reflected off the front of stack 56, while light component of the other polarization is transmitted through stack 56.

Figure 4:
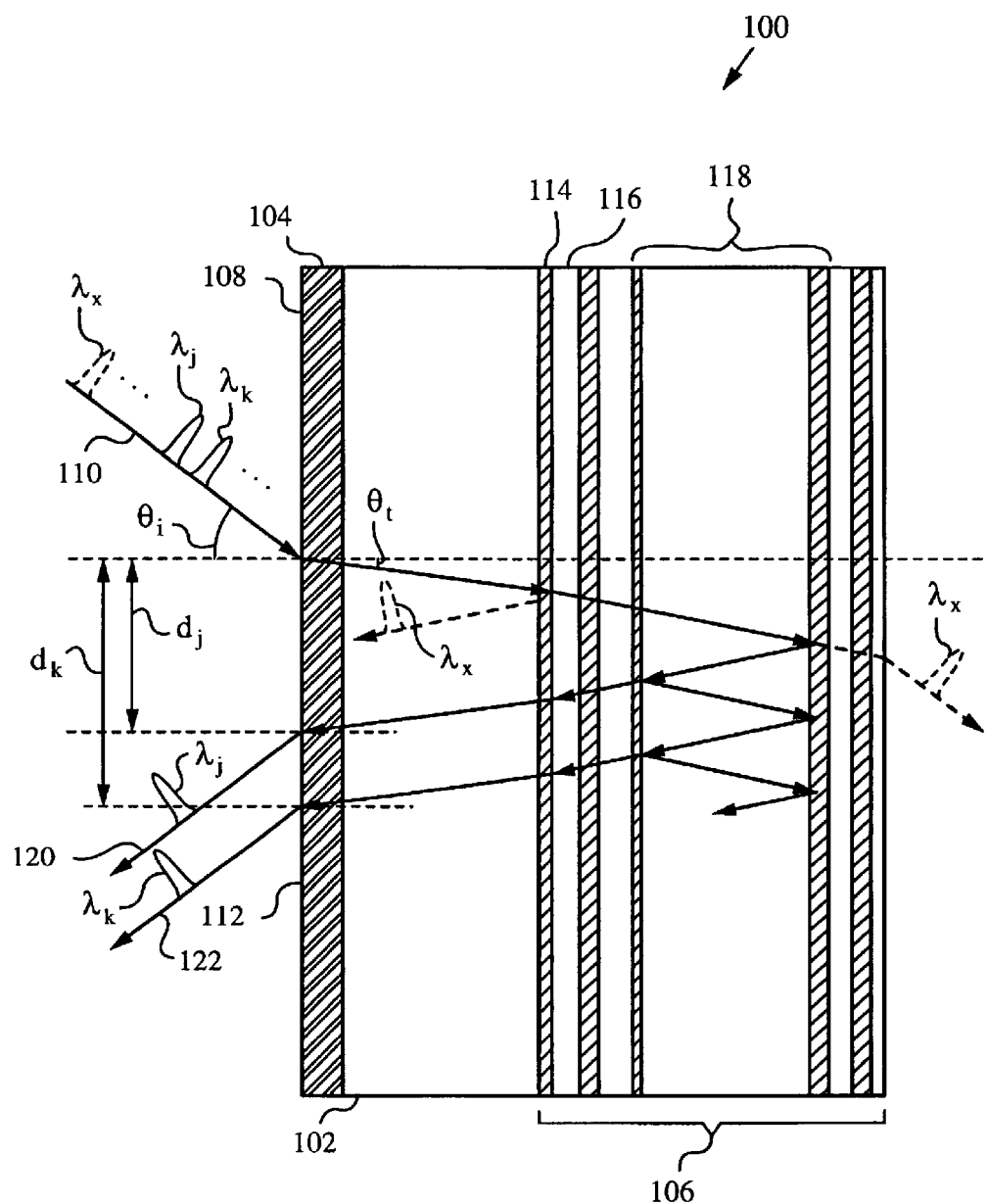
FIG. 4 is a cross sectional view of an apparatus for demultiplexing or multiplexing light employing a multilayer thin-film stack having a layer sequence defining an energy confinement region for a certain light component.

FIG. 4 illustrates yet another embodiment of an apparatus 100 in accordance with the invention. Apparatus 100 has a substrate 102, an impedance matching mechanism 104 in the form of an anti-reflection coating as well as a multilayer thin-film stack 106. Apparatus 100 has an input face 108 for admitting a light 110 containing a number of component wavelengths within a desired operation bandwidth, of which component wavelengths $\lambda_j$ and $\lambda_k$ are expressly indicated. An output face 112 of apparatus 100 is on the same side as input face 108 and is, in fact, a portion of the same surface.

Anti-reflection coating 104 is deposited directly on input face 108 of substrate 102. Coating 104 is made of a material or layers of materials that reduce reflection of light 110 containing wavelengths in the desired operation bandwidth. For example, a simple anti-reflection coating might consist of a quarter-wave layer at the center wavelength with a refractive index that is the square root of the refractive index of the substrate 102. As is well known from the prior art, more complex anti-reflection coatings can be designed consisting of several layers and offering low reflection over a larger bandwidth.

In apparatus 100 multilayer thin-film stack 106 has a sequence of layers 114, 116 hereafter referred to simply as layer sequence defining an energy confinement region 118. Region 118 forms a cavity between layers 114, 116 that functions as a Fabry-Perot resonator or a Gires-Tournois resonator for certain wavelengths of light 110. Specifically, cavity 118 has a different quality factor for light components 120, 122 at component wavelengths $\lambda_j$, $\lambda_k$. Because of a lower quality factor, light component 120 at $\lambda_j$ performs only one effective bounce in cavity 118 while light component 122 at $\lambda_k$ has a higher quality factor and performs two effective bounces in cavity 118. In other words, cavity 118 confines the energy of light at wavelengths $\lambda_j$, $\lambda_k$ to a different degree. The portion of light 110 that is not resonant within region 118, e.g., light at wavelength $\lambda_x$, will be reflected off the front of thin-film stack 106 or passed through it, as indicated by the dashed arrow. The dispersion characteristics of the structure are defined by the choice of the reflective layer sequences on either side of cavity 118. As is well known to someone skilled in the art, reflectors with a high reflectivity result in cavity 118 having a high quality factor and high-energy storage. This high amount of confined energy corresponds to many effective bounces within the cavity. Off-resonant wavelengths experience a much lower quality factor corresponding to less confined energy and fewer effective bounces in cavity 118. Thus, by using cavity 118 at non-normal incidence one obtains spatial separation or dispersion of light components experiencing different quality factors. It is important that the length of cavity 118 be chosen small enough to allow sufficient field overlap between the bounces for the given angle of incidence $\theta_i$ such that any light component, e.g., light component 122 undergoing multiple bounces still constitutes substantially one beam of light. When this condition is not fulfilled, an input beam at a given wavelength is divided into several separate output beams, which is not desired. It should be noted that photons of light belonging to the individual light components 120, 122 do not perform an exact integer number of bounces within cavity 118, but rather that there is a characteristic number that constitutes an average number of bounces for photons of each of light components 120, 122. It is this characteristic number of bounces that is indicated in the figure for illustrative purposes.

The above rules teach how to engineer cavity 118 such that light components at different wavelengths perform different numbers of bounces within cavity 118 before emerging from it. In order to increase the flexibility in designing the characteristic number of bounces as a function of wavelength, more cavities can be added in the layer sequence 106. The design of such coupled-cavity structures for normal incidence light is discussed by M. Jablonsky et al., "The Realization of All-Pass Filters for Third-Order Dispersion Compensation in Ultrafast Optical Fiber Transmission Systems", Journal of Lightwave Technology, Vol. 19, No. 8, August 2001, pp. 1194–1205. These design procedures based on digital filter design techniques can be adapted for non-normal incidence by scaling the cavity lengths appropriately and designing mirrors with the necessary reflectivities. The design of thin-film mirror structures with a given reflectivity at non-normal incidence is well known to someone skilled in the art. As for a single cavity structure, sufficient field overlap between different bounces and different cavities has to be ensured.

During operation, the difference in the characteristic number of bounces performed by light component 120 and light component 122 produces a spatial shift between them. Thus, light components 120 and 122 exit at spatially separated locations along output face 112 as shown. The distances between the entry point of light 110 and exit points of spatially separated light components 120, 122 are indicated by $d_j$ and $d_k$. Of course, the amount of shift between light components 120, 122 and hence the distances $d_j$, $d_k$ can be increased by taking advantage of the superprism effect anywhere within stack 106. Apparatus 100 can be used as shown to demultiplex light 100 as a function of wavelength. Alternatively, it can be operated in reverse to multiplex light components of different wavelengths.

For multiplexing or demultiplexing light components of different polarizations, stack 106 is designed such that different polarization components experience a different characteristic number of bounces. This is achieved by assuring that the quality factor of the cavity 118 is different for the different polarization components. This difference corresponds to a difference in confined energy and thus a different effective number of bounces.

In a preferred embodiment of an apparatus of the invention turning point control, energy confinement and the superprism effect are all called upon to achieve a large spatial shift of light as a function of its light parameter, i.e., its wavelength and/or polarization. Such combination offers the designer the highest flexibility in designing dispersive structures. It is convenient to combine the above-described algorithms and methods for building each of the three light shifting mechanisms into a single numerical optimization method in the form of a thin-film filter design technique. The below examples illustrate the performance of structures using one or more of the effects.

EXAMPLE 1

FIG. 5 illustrates the thicknesses of layers in an apparatus according to the invention. The apparatus has a structure of stacks including 60 silicon dioxide/tantalum pentoxide layers using a wavelength dependent turning point. Portions of the stacks are double-chirped to yield impedance matching and spatial shifting at the same time. The chirped Bragg wavelength $\lambda_B$ in units of meters as a function of the period number m is given by:

$$\lambda_B(m) = \frac{1.414*10^{-6}}{\sqrt{1 - 8.47*10^{-3}*m}}.$$

Periods 1 to 25 of the stack are double-chirped and the layer thicknesses of the high index layers $d_{HDC}$ and low index layers $d_{LDC}$ are calculated as a function of the period number m, the vacuum angle of incidence $\theta_i$ and the high and low refractive indices $n_H$ and $n_L$ by:

$$d_{HDC}(m) = \frac{\lambda_B(25)}{4n_H\sqrt{1-\left(\frac{\sin(\theta_i)}{n_H}\right)^2}}\left(\frac{m}{25}\right)^{1.05}, \text{ and}$$

$$d_{LDC}(m) = \frac{\frac{\lambda_B(m)}{2} - d_{HDC}(m)n_H\sqrt{1-\left(\frac{\sin(\theta_i)}{n_H}\right)^2}}{4n_L\sqrt{1-\left(\frac{\sin(\theta_i)}{n_L}\right)^2}}.$$

The last 5 periods are single-chirped with the layer thicknesses of the high index layers $d_{HSC}$ and low index layers $d_{LSC}$ calculated by:

$$d_{HSC}(m) = \frac{\lambda_B(m)}{4n_H\sqrt{1-\left(\frac{\sin(\theta_i)}{n_H}\right)^2}}, \text{ and}$$

$$d_{LSC}(m) = \frac{\lambda_B(m)}{4n_L\sqrt{1-\left(\frac{\sin(\theta_i)}{n_L}\right)^2}}.$$

Figure 6B:
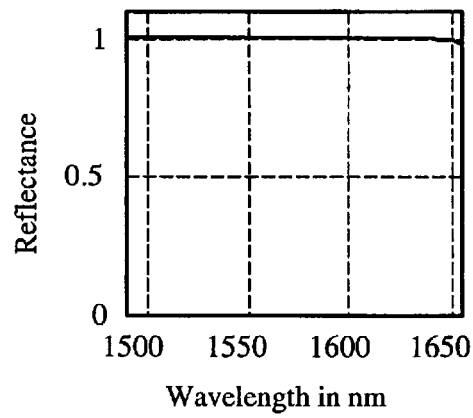

This type of structure is preferred when a wide range of wavelengths, e.g. 150 nm, is present in the light that is to be separated into light components. In this example the total thickness is 16 µm, the angle of incidence $\theta_i$ of the light is 45° and the light is p-polarized. This apparatus has excellent performance characteristics as illustrated in the graphs of FIGS. 6A&B. Specifically, FIG. 6A illustrates the shift of light components along the output face as a function of wavelength between 1500 and 1650 nm. It should be noted that the shift is well-behaved and fairly linear. FIG. 6B illustrates that the reflectivity of the structure over the same range of wavelengths is excellent and substantially equal to 1.

EXAMPLE 2

FIG. 7 illustrates the thicknesses of layers in another apparatus according to the invention. The apparatus has a structure of stacks including 33 layers with four energy confinement regions. It should be noted that using energy confinement regions is preferable when the light to be separated into light components contains a narrow range of wavelengths, e.g. 10 nm or 20 nm. The layers are made of silicon dioxide and tantalum pentoxide. In this example the total thickness is 28.4 µm, the angle of incidence $\theta_i$ of the light is 54° and the light is s-polarized. The shift of light components as a function of wavelength between 1530 nm and 1560 nm is illustrated in FIG. 8A. FIG. 8B illustrates the reflectivity of the structure over the same range of wavelengths.

EXAMPLE 3

Figure 10B:
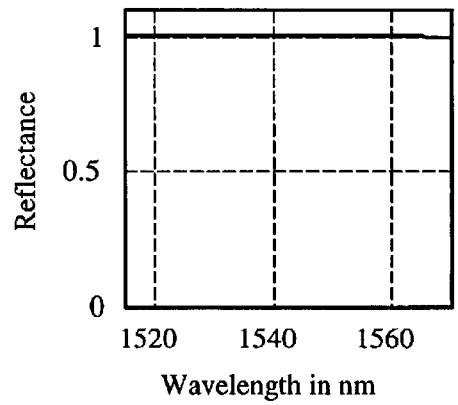

FIG. 9 illustrates the thicknesses of layers in yet another apparatus according to the invention. The apparatus has a structure of stacks including 66 layers using a combination of the turning point, energy confinement and superprism effects. The layers are made of silicon dioxide and tantalum pentoxide. The total thickness is 23.9 µm, the angle of incidence $\theta_i$ of the light is 45° and the light is p-polarized. The graphs in FIGS. 10A and 10B illustrate the shift of light components as a function of wavelength and reflectivity of the structure over a wavelength range from 1515 to 1570 nm.

EXAMPLE 4

FIG. 11 illustrates yet another example structure that combines the different types of spatial shifting that lead to a very desirable dispersion properties. The circles represent the shift experimentally obtained with a 200-layer periodic dielectric stack designed in accordance with the prior art. The crosses on the other hand show the experimental results obtained with a 66-layer dielectric stack with layer sequence illustrated in FIG. 13 that was designed for linear shift with wavelength utilizing both spatial shifting due to wavelength-dependent turning point and multiple round-trips in energy confining regions. The solid lines represent the theoretically expected values for both structures. Both experiments were performed in the 850 nm to 1550 nm wavelength range. It is clearly visible from the graphs that the novel non-periodic layer sequence designed in accordance with the invention exhibits not only a much more linear shift with wavelength, but also a higher total shift with only a third of the number of layers.

FIGS. 12A&B more clearly demonstrate how the dispersion of the 66-layer structure of FIG. 11 is based both on the wavelength-dependent turning point and multiple round trips in energy confinement regions. The four circles on the graph in FIG. 12A correspond to the electric field patterns shown in FIG. 12B. The graphs in FIG. 12B show the electric field intensities in the direction along the layers of the forward propagating light for four different wavelengths as a function of position in the dielectric stack. The light is incident from the left side with unity intensity. The dashed and dotted vertical lines mark the positions of layer interfaces. The presence of intensity in the structure determines how far the electric field penetrates the structure at a certain wavelength. An electric field intensity larger than unity corresponds to confined energy and therefore multiple round-trips in energy confinement regions. It is clear that the light penetrates the dielectric stack further for longer wavelengths. This causes dispersion or spatial shifting of light due to wavelength-dependent turning points. At the same time, one can also see an increased amount of confined energy for longer wavelengths evidenced by larger than unity intensity. Again, this further increases the dispersion.

The novel non-periodic layer sequence was designed using a 30-period impedance matched periodic stack to prevent reflections off the front of the thin-film stack. Half-wave layers were added to the front of the stack to increase the minimum layer thickness allowing for less stringent fabrication tolerances. Next a merit function was defined targeting a linear shift with wavelength. Numerical optimization techniques known in the art were used to achieve the desired dispersion characteristics. At the end six more layers were added to the front of the stack for calibration during fabrication. These layers do not influence the operation.

Alternative Embodiments

Those skilled in the art will appreciate that the techniques illustrated in the above embodiments may be combined and extended in many straightforward ways to produce various other embodiments. For example, the design methods of the invention can be used to combine the three types of spatial shifting to produce linear or non-linear dispersion properties as a function of wavelength and/or polarization. FIG. 14 illustrates an example of a structure exhibiting a staircase-like shift with wavelength. While a linear shift with wavelength corresponds to a Gaussian passband, the structure of FIG. 14 achieves a flatter passband for sufficiently large spot sizes. A device employing this type of stack can be used, e.g., as a 4:1 multiplexer/demultiplexer for coarse WDM.

FIG. 15 illustrates still another embodiment of an apparatus 150 in accordance with the invention employing two mirrors or reflectors 152 and 154. Apparatus 150 has a substrate 156, an impedance matching stack 158 and a thin-film stack 160. Stacks 158, 160 can employ any or all of the above discussed three spatial shifting mechanisms to spatially shift a light 162 to separate it into light components 164 as a function of wavelength. Only two components 164 of light 162 at component wavelengths $\lambda_j$, $\lambda_k$ are shown for reasons of, clarity.

Light 162 enters apparatus 150 though input face 166. Reflectors 152, 154 are placed in the path of light 162 such that they reflect light 162 twice through stack 160 and stack 158. Thus, the total path length along which light 162 undergoes spatial shifting is extended. As a result, the total spatial shift or separation along an output face 168 of light components 164 is increased. Of course, apparatus 150 can be used for demultiplexing of light 162 as well as multiplexing of light components 164, as indicated by the bi-directional arrows.

FIG. 16 illustrates an apparatus 170 in accordance with the invention employing a lens 172 to convert the spatial shift of light components 174 separated from light 176 by stacks 178, 180 in accordance with any or all of the above-discussed spatial shifting mechanisms into an angular shift. Apparatus 170 has a substrate 182 and anti-reflection coatings 184, 186 on an input face 188 and an output face 190, respectively to reduce reflection losses. Furthermore, apparatus 170 uses two reflectors 192, 194 to achieve even larger spatial separation of components 174 before conversion of their spatial shift to angular shift by lens 172. Several embodiments of refectors 192, 194 are possible including traditional metal coatings and thin-film multilayer Bragg reflectors. It should be noted that lens 172 can be any type of lens, including a Fresnel lens. Alternatively, a number of individual lenses, as indicated in dashed lines 196, may be used to achieve specific angular shifting and/or focusing functions for individual components 172.

It will be apparent to a person skilled in the art that the apparatus and method of invention admit of a large variety of embodiments. It will also be appreciated by those skilled in the art that the devices of the present invention can be fabricated on the same substrate along with other semiconductor optical, electronic, or optoelectronic devices. Thus, various embodiments of the present invention may be included as a part of various complicated multi-component integrated devices. Therefore, the scope of the invention should be determined based on the appended claims and their legal equivalents.

What is claimed is:

1. An apparatus for spatially shifting a light comprising:
   a) a multilayer thin-film stack of at least two materials having unequal optical properties;
   b) an input face for admitting said light;
   c) an impedance matching means for maximizing the in-coupling of said light into said multilayer thin-film stack at a non-normal incidence;
   wherein said non-normal incidence is sufficient to generate a spatial shift of said light in said multilayer thin-film stack as a function of at least one light parameter of said light.

2. The apparatus of claim 1, wherein said multilayer thin-film stack comprises a layer sequence defining a turning point for at least one light component of said light as a function of said at least one light parameter selected from the group consisting of wavelength and polarization.

3. The apparatus of claim 1, wherein said multilayer thin-film stack comprises a layer sequence defining an energy confinement region for at least one light component of said light as a function of said at least one light parameter selected from the group consisting of wavelength and polarization.

4. The apparatus of claim 1, wherein said multilayer thin-film stack comprises a chirped Bragg stack.

5. The apparatus of claim 1, wherein said multilayer thin-film stack comprises an all-pass filter.

6. The apparatus of claim 1, wherein said at least two materials have a reflection band excluding a bandwidth of said light.

7. The apparatus of claim 6, wherein said multilayer thin-film stack comprises a Bragg stack and said reflection band comprises a stop band of said Bragg stack.

8. The apparatus of claim 1, wherein said impedance matching means comprises at least one mechanism selected from the group consisting of optical cavity, anti-reflection coating, chirped Bragg stack and double-chirped Bragg stack.

9. The apparatus of claim 8, wherein said mechanism is integrated into said multilayer thin-film stack.

10. The apparatus of claim 1, further comprising an output face for said light, whereby said light is spatially separated along said output face as a function of at least one light parameter selected from the group consisting of wavelength and polarization.

11. The apparatus of claim 10, wherein said output face is opposite said input face.

12. The apparatus of claim 10, wherein said output face is on the same side as said input face.

13. The apparatus of claim 1, further comprising at least one reflector in the path of said light for reflecting said light into said multilayer thin-film stack.

14. The apparatus of claim 1, further comprising at least one lens for converting said spatial shift into an angular shift.

15. The apparatus of claim 1, wherein said optical properties are selected from the group consisting of refractive index and absorption coefficient.

16. An apparatus for spatially shifting a light comprising:
   a) a multilayer thin-film stack of at least two materials having unequal optical properties, said multilayer thin-film stack comprising a layer sequence defining a turning point for at least one light component of said light as a function of at least one light parameter selected from the group consisting of wavelength and polarization;
   b) an input face for admitting said light at a non-normal incidence, wherein said non-normal incidence is sufficient to generate a spatial shift of said light in said multilayer thin-film stack as a function of said at least one light parameter.

17. The apparatus of claim 16, further comprising an impedance matching means for maximizing the in-coupling of said light into said multilayer thin-film stack at said a non-normal incidence.

18. The apparatus of claim 17, wherein said impedance matching means comprises at least one mechanism selected from the group consisting of optical cavity, anti-reflection coating, chirped Bragg stack and double-chirped Bragg stack.

19. The apparatus of claim 18, wherein said mechanism is integrated into said multilayer thin-film stack.

20. The apparatus of claim 16, wherein said multilayer thin-film stack further comprises a layer sequence defining an energy confinement region for at least one light component of said light as a function of said at least one light parameter.

21. The apparatus of claim 16, wherein said optical properties are selected from the group consisting of refractive index and absorption coefficient.

22. An apparatus for spatially shifting a light comprising:
   a) a multilayer thin-film stack of at least two materials having unequal optical properties, said multilayer thin-film stack comprising a layer sequence defining an energy confinement region for at least one light component of said light as a function of at least one light parameter selected from the group consisting of wavelength and polarization;
   b) an input face for admitting said light at a non-normal incidence, wherein said non-normal incidence is sufficient to generate a spatial shift of said light in said multilayer thin-film stack as a function of said at least one light parameter.

23. The apparatus of claim 22, further comprising an impedance matching means for maximizing the in-coupling of said light into said multilayer thin-film stack at said a non-normal incidence.

24. The apparatus of claim 23, wherein said impedance matching means comprises at least one mechanism selected from the group consisting of optical cavity, anti-reflection coating, chirped Bragg stack and double-chirped Bragg stack.

25. The apparatus of claim 24, wherein said mechanism is integrated into said multilayer thin-film stack.

26. The apparatus of claim 22, wherein said multilayer thin-film stack further comprises a layer sequence defining a turning point for at least one light component of said light as a function of said at least one light parameter.

27. The apparatus of claim 22, wherein said optical properties are selected from the group consisting of refractive index and absorption coefficient.

28. A method for spatially shifting a light in a multilayer thin-film stack of at least two materials having unequal optical properties, said method comprising:
   a) providing an input face for admitting said light into said multilayer thin-film stack;
   b) providing an impedance matching means for maximizing the in-coupling of said light into said multilayer thin-film stack at a non-normal incidence;
   c) selecting said non-normal incidence sufficient to generate a spatial shift of said light in said multilayer thin-film stack as a function of at least one light parameter of said light; and
   d) illuminating said input face with said light at said non-normal incidence.

29. The method of claim 28, further comprising spatially demultiplexing said light into light components as a function of said at least one light parameter selected from the group consisting of wavelength and polarization.

30. The method of claim 29, further comprising providing an output face for out-coupling said light components.

31. The method of claim 30, further comprising adjusting a layer sequence of said multilayer thin-film stack such that said light components are out-coupled at predetermined distances.

32. The method of claim 31, wherein said predetermined distances vary linearly with said light parameter.

33. The method of claim 29, further comprising adjusting a layer sequence of said multilayer thin-film stack to define a turning point for at least one of said light components as a function of said at least one light parameter.

34. The method of claim 29, further comprising adjusting a layer sequence of said multilayer thin-film stack to define an energy confinement region for at least one of said light components as a function of said at least one light parameter.

35. A method for spatially shifting light components in a multilayer thin-film stack of at least two materials having unequal optical properties, said method comprising:
   a) providing an input face for admitting said light components into said multilayer thin-film stack;
   b) providing an impedance matching means for maximizing the in-coupling of said light components into said multilayer thin-film stack at a non-normal incidence;
   c) selecting said non-normal incidence sufficient to generate a spatial shift of said light components in said multilayer thin-film stack as a function of at least one light parameter of said light components; and
   d) illuminating said input face with said light components at said non-normal incidence.

36. The method of claim 35, further comprising spatially multiplexing said light components into a light as a function of said at least one light parameter selected from the group consisting of wavelength and polarization.

37. The method of claim 36, further comprising providing an output face for out-coupling said light.

38. The method of claim 37, further comprising adjusting a layer sequence of said multilayer thin-film stack such that said light components are out-coupled at predetermined distances.

39. The method of claim 38, wherein said predetermined distances vary linearly with said light parameter.

40. The method of claim 36, further comprising adjusting a layer sequence of said multilayer thin-film stack to define a turning point for at least one of said light components as a function of said at least one light parameter.

41. The method of claim 36, further comprising adjusting a layer sequence of said multilayer thin-film stack to define an energy confinement region for at least one of said light components as a function of said at least one light parameter.

* * * * *